United States Patent
Huang et al.

(10) Patent No.: US 12,429,991 B2
(45) Date of Patent: Sep. 30, 2025

(54) TOUCHPAD

(71) Applicant: Primax Electronics Ltd., Taipei (TW)

(72) Inventors: Wei-Chiang Huang, Taipei (TW); Wei-Ping Chan, Taipei (TW); Tse-Ping Kuan, Taipei (TW); Ming-Hui Yeh, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 18/755,015

(22) Filed: Jun. 26, 2024

(65) Prior Publication Data

US 2025/0208742 A1  Jun. 26, 2025

(30) Foreign Application Priority Data

Dec. 26, 2023 (TW) ................. 112150875

(51) Int. Cl.
*G06F 3/046* (2006.01)
(52) U.S. Cl.
CPC .................. *G06F 3/046* (2013.01)
(58) Field of Classification Search
CPC ....................................... G06F 3/046
See application file for complete search history.

(56) References Cited

U.S. PATENT DOCUMENTS 10,032,550 B1 * 7/2018 Zhang ............... H01F 7/064
2017/0084138 A1 * 3/2017 Hajati ............... G08B 6/00

* cited by examiner

Primary Examiner — Lisa S Landis
(74) Attorney, Agent, or Firm — KIRTON McCONKIE; Evan R. Witt (57) ABSTRACT

A touchpad includes a substrate, an elastic bracket and an actuating device. The substrate has a first surface and a second surface. The elastic bracket is located beside the second surface of the substrate. The actuating device includes a first actuating member and a second actuating member. The first actuating member is located near the second surface of the substrate. The second actuating member is aligned with the first actuating member and fixed on a side of the elastic bracket facing the substrate. The first actuating member and the second actuating member are movable relative to each other in response to a magnetic field force. Consequently, a relative vibration between the substrate and the elastic bracket is generated. The first actuating member includes at least one first coil. Each of the at least one first coil is spirally wound to form a first hollow region.

10 Claims, 10 Drawing Sheets

TOUCHPAD

FIELD OF THE INVENTION

The present invention relates to a touch input device, and more particularly to a touchpad.

BACKGROUND OF THE INVENTION

A touchpad is an input device used to control a cursor on a computer, a tablet, or the like. The touchpad senses the position and movement of the user's finger through a touch sensor and controls the movement of the cursor on a display device. The pressure touchpad is equipped with a haptic feedback device and a pressure sensing device to replace physical buttons. Consequently, the pressure sensing device also solves the problems of the conventional touchpads that can be locally pressed only.

In order to provide the user with better use experiences, the pressure touch pad will be equipped with a haptic feedback device to simulate the feel of physical vibration feedback. The common haptic feedback devices include piezoelectric ceramic haptic feedback devices and linear motor haptic feedback devices.

The piezoelectric ceramic haptic feedback device is usually equipped with plural piezoelectric ceramic elements, which are arranged in a staggered manner on a casing of an electronic device. When the piezoelectric ceramic element is pressed and subjected to deformation, the pressure is sensed. The control unit outputs a pulse signal to the piezoelectric ceramic element. In response to the pulse signal, an electric field is generated in the polarization direction of the piezoelectric ceramic element. Consequently, the mechanical deformation is generated, and the vibration feedback is achieved. However, the piezoelectric ceramic element has some drawbacks. For example, the assembly of the piezoelectric ceramic elements may cause the fulcrum of the piezoelectric ceramic elements to be non-coplanar and result in tolerances. Consequently, the pressure and the vibration feedback will be inconsistent. Moreover, the vibration direction provided by the piezoelectric ceramic element is only restricted to the back-and-forth swinging direction perpendicular to the touchpad.

In the linear motor haptic feedback device, the linear motor is directly fixed to the bottom of the touchpad, and a specified driving signal is used to drive the internal vibrator of the linear motor to swing back and forth in a direction perpendicular to the touchpad. Consequently, the entire motor is driven to vibrate, and the vibration feedback purpose is achieved. However, the use of the linear motor has some drawbacks. For example, since the internal structure is complicated and the production difficulty is high, the fabricating cost is high. In addition, the linear motor is thick and large in size. Since the linear motor occupies the battery space of the electronic device, the use of the linear motor is not feasible to some slim-type electronic devices.

In order to be applicable to the slim-type electronic device and provide a more direct vibration feeling, U.S. Pat. No. 11,619,997 provides a touch module with magnet and magnetic coil to generate vibration. In the haptic feedback device of this patent, a sensing wire is formed on a circuit board through an etching process to form a loop of the sensing coil, and then the circuit board is attached on the surface of the touch circuit board. The vibration feedback is generated through the magnetic field of a magnetic body. Due to this structural design, the touch module can be made thin. However, this design still has some drawbacks. For example, in order to increase the inductance and design a multi-layer loop, a multi-layer circuit board is required. Generally, the multi-layer circuit board is relatively expensive, and the yield of the multi-layer circuit board is usually not satisfied.

In order to overcome the drawbacks of the conventional technologies, it is important to provide a cost-effective haptic feedback device for providing more intuitive touch feedback.

SUMMARY OF THE INVENTION

An object of the present invention provides an improved touchpad.

The other objects and advantages of the present invention will be understood from the disclosed technical features.

In accordance with an aspect of the present invention, a touchpad is provided. The touchpad includes a substrate, an elastic bracket and an actuating device. The substrate has a first surface and a second surface. The first surface and the second surface are opposed to each other. The elastic bracket is located beside the second surface of the substrate. The actuating device includes a first actuating member and a second actuating member. The first actuating member is located near the second surface of the substrate. The second actuating member is aligned with the first actuating member and fixed on a side of the elastic bracket facing the substrate. The first actuating member and the second actuating member are movable relative to each other in response to a magnetic field force. Consequently, a relative vibration between the substrate and the elastic bracket is generated. The first actuating member includes at least one first coil. Each of the at least one first coil is spirally wound to form a first hollow region. An extension direction of the first hollow region is perpendicular to the substrate and the elastic bracket.

In an embodiment, the first coil is a copper wire.

In an embodiment, a diameter of the first coil is in a range between 0.05 mm and 0.1 mm, and a turn number of the first coil is 70 to 300.

In an embodiment, the first actuating member further includes a support element, and the support element has a top surface and a bottom surface. The top surface and the bottom surface are opposed to each other. The at least one coil is fixed on the bottom surface of the support element. The top surface of the support element is fixed on the second surface of the substrate.

In an embodiment, at least one positioning structure is formed on the second surface of the substrate, and the support element further includes at least one positioning notch corresponding to the at least one positioning structure.

In an embodiment, the support element is made of plastic material, manganese-zinc alloy or tinplate, or the support element is a flexible printed circuit board.

In an embodiment, the elastic bracket includes a supporting region and a carrying region. The supporting region has a first thickness. The carrying region has a second thickness. The first thickness is greater than the second thickness.

In an embodiment, the second actuating member is fixed on a middle site of the carrying region, the first actuating member is located near the middle site of the carrying region, and the first actuating member is located over the second actuating member.

In an embodiment, the second actuating member includes a magnetic element. A magnetization direction of the magnetic element is perpendicular to the extension direction of the first hollow region or in parallel with the extension direction of the first hollow region.

In an embodiment, the second actuating member includes at least one second coil. Each of the at least one second coil is spirally wound to form a second hollow region. An extension direction of the second hollow region is in parallel with the extension direction of the first hollow region.

In an embodiment, the second actuating member includes plural magnetic elements, which are arranged in a Halbach array.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
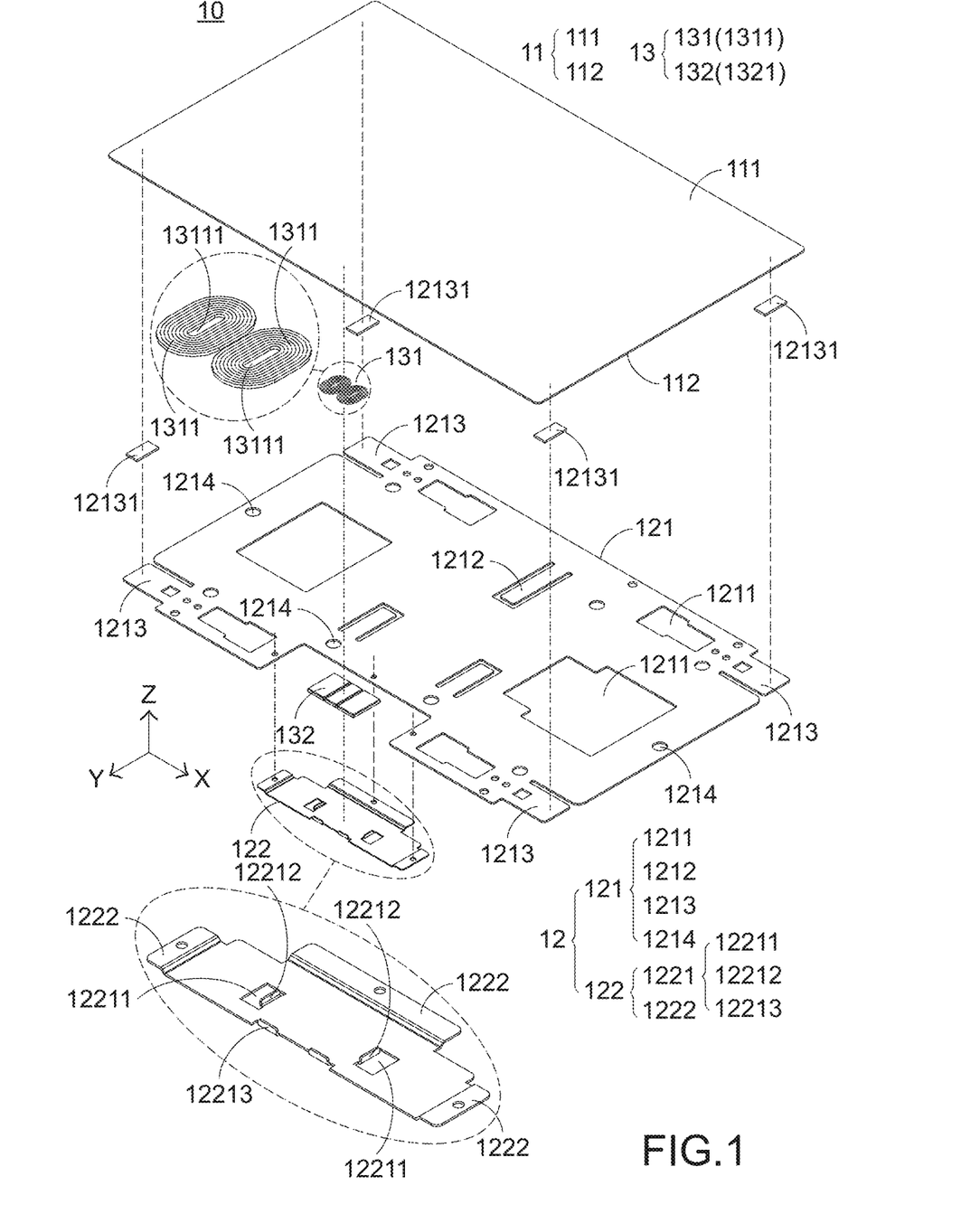
FIG. 1 is a schematic exploded view illustrating the structure of a touchpad according to a first embodiment of the present invention.
Figure 2:
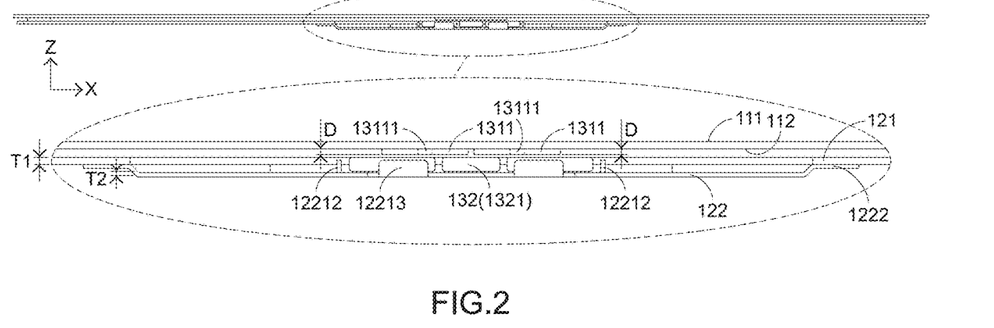
FIG. 2 is a schematic side view illustrating the structure of the touchpad according to a first embodiment of the present invention.
Figure 3:
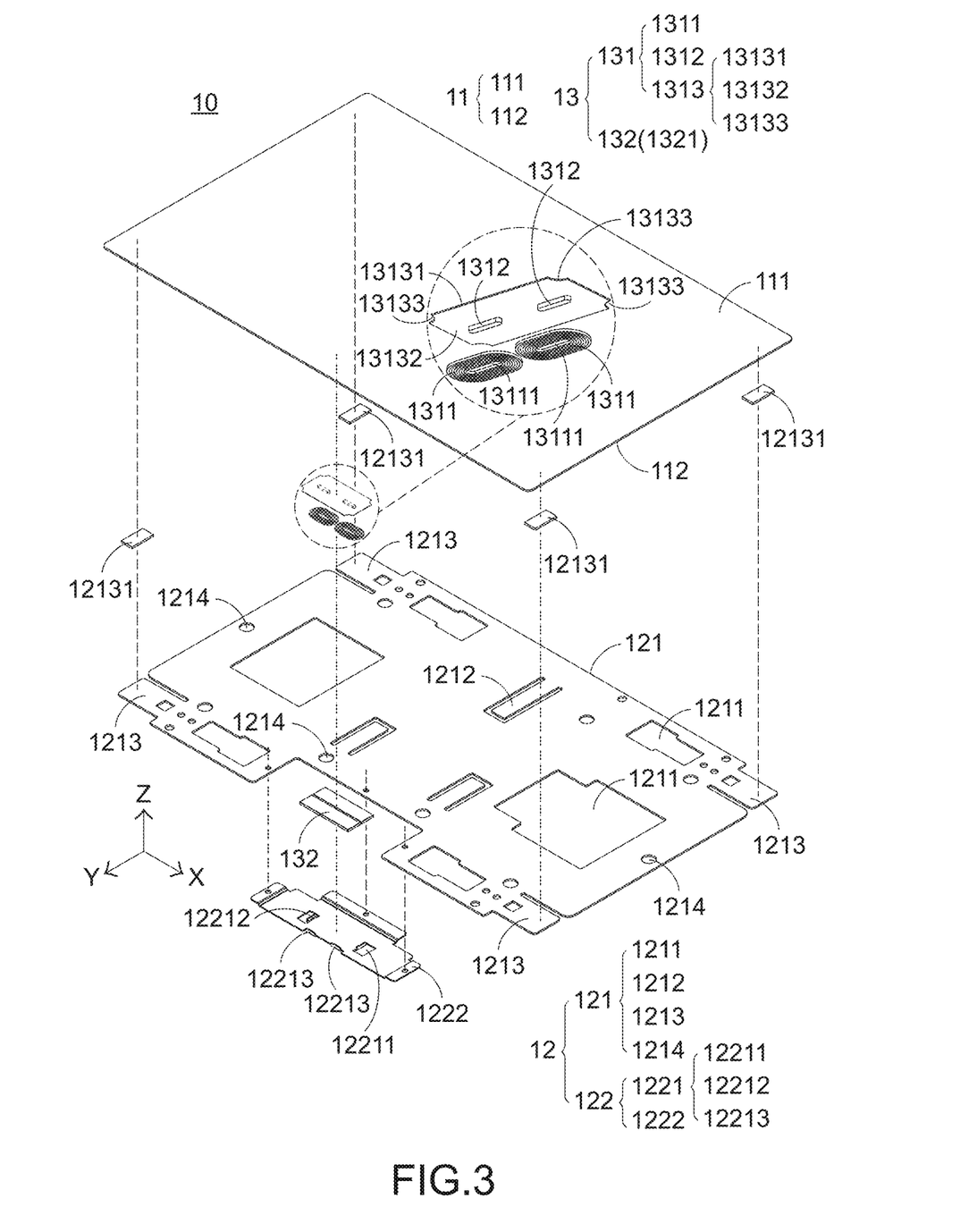
FIG. 3 is a schematic exploded view illustrating the structure of a touchpad according to a second embodiment of the present invention.
Figure 4A:
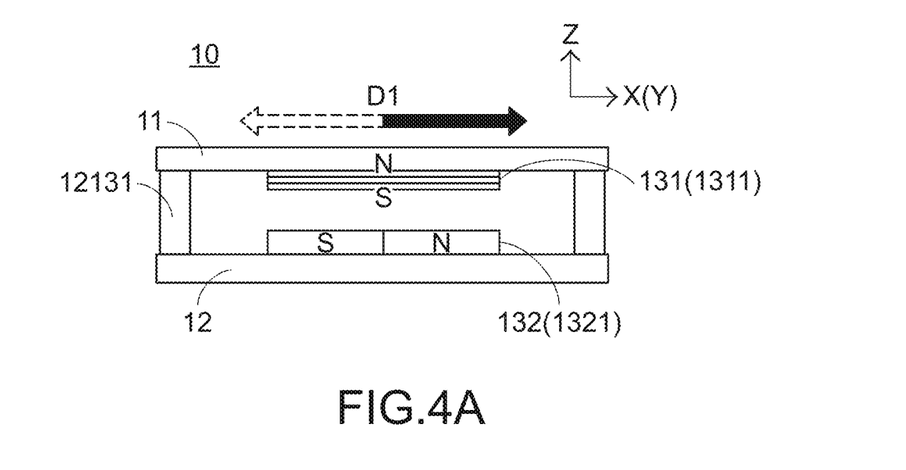
FIGS. 4A, 4B, 4C and 4D are schematic side views illustrating two implementation examples of the relative movement between a first actuating member and a second actuating member in an actuating device of the touchpad according to the first embodiment.
Figure 4B:
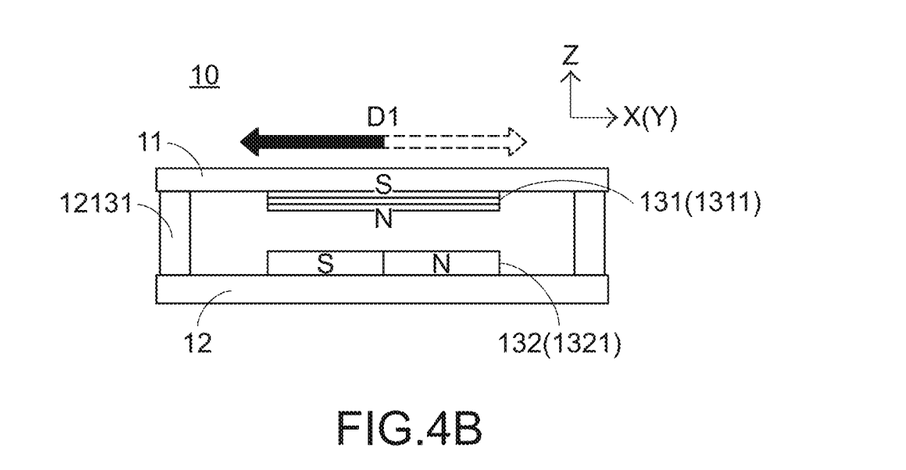
Figure 4C:
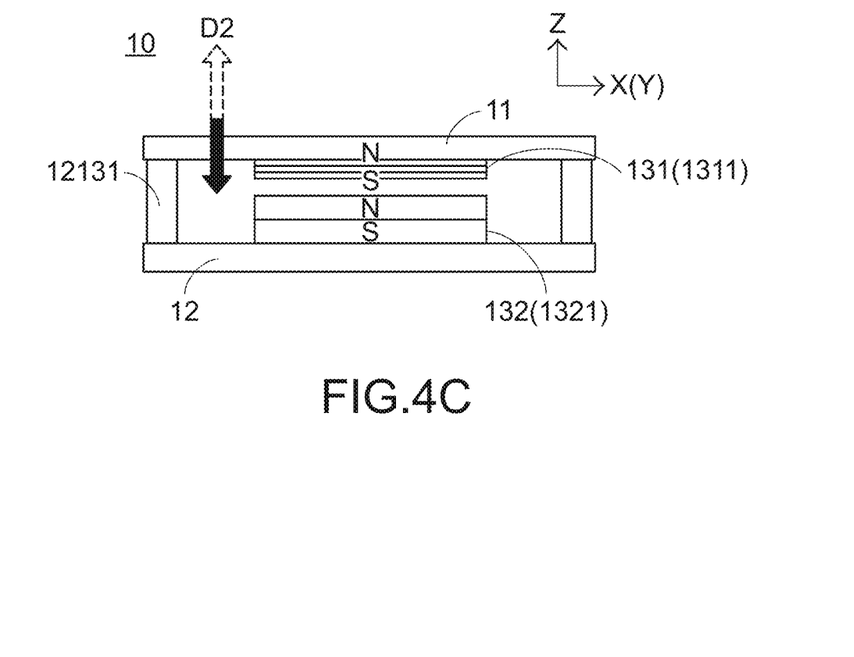
Figure 4D:
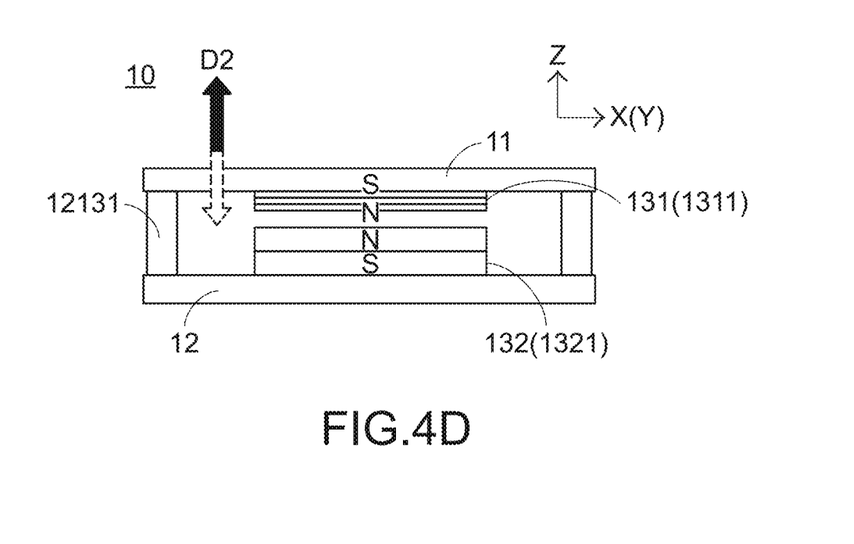
Figure 5A:
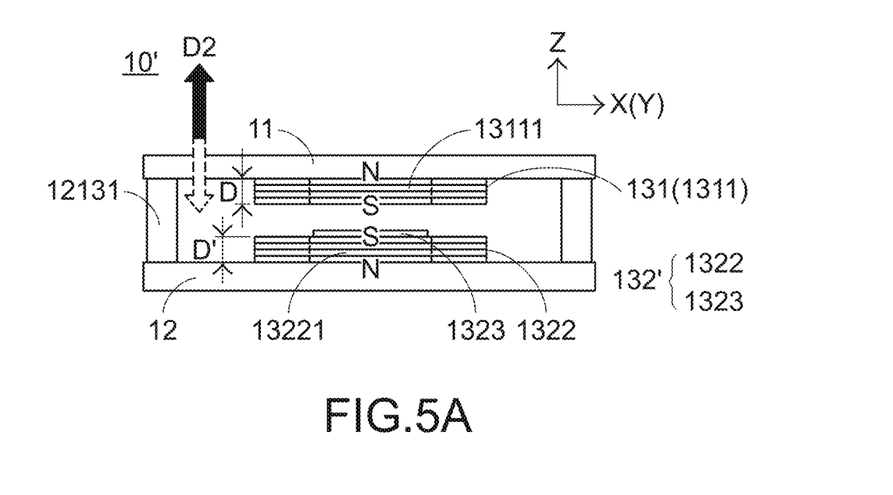
FIGS. 5A to 5H are schematic side views illustrating some other implementation examples of the relative movement between a first actuating member and a second actuating member in an actuating device of the touchpad according to some other embodiments.
Figure 5B:
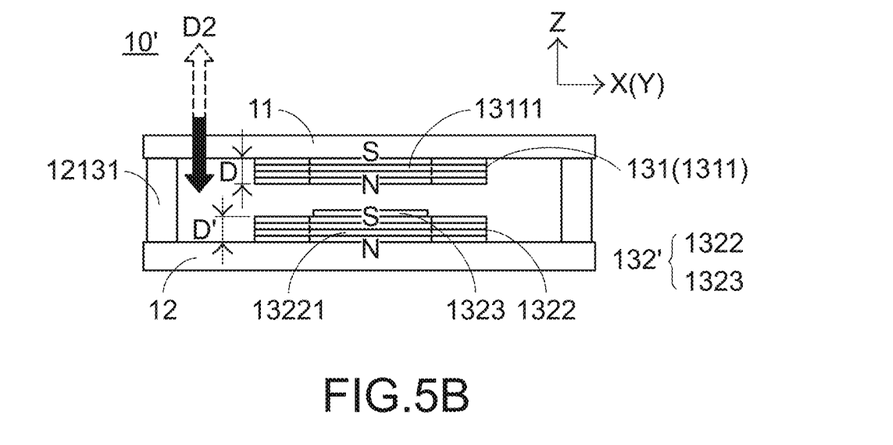
Figure 5C:
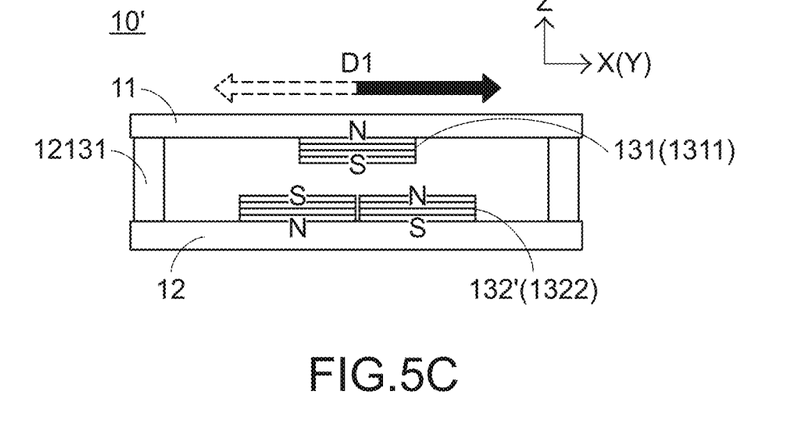
Figure 5D:
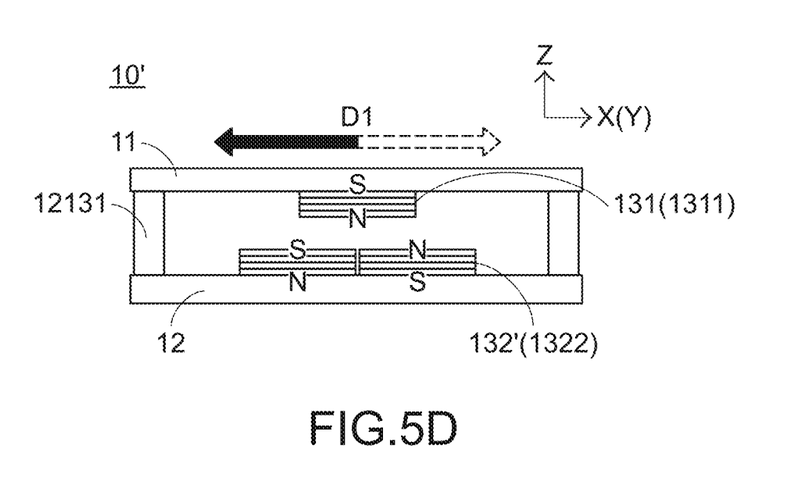
Figure 5E:
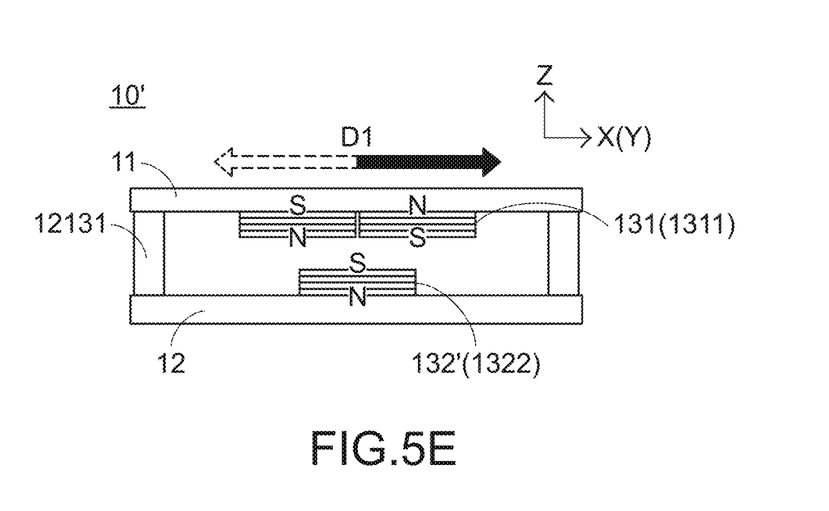
Figure 5F:
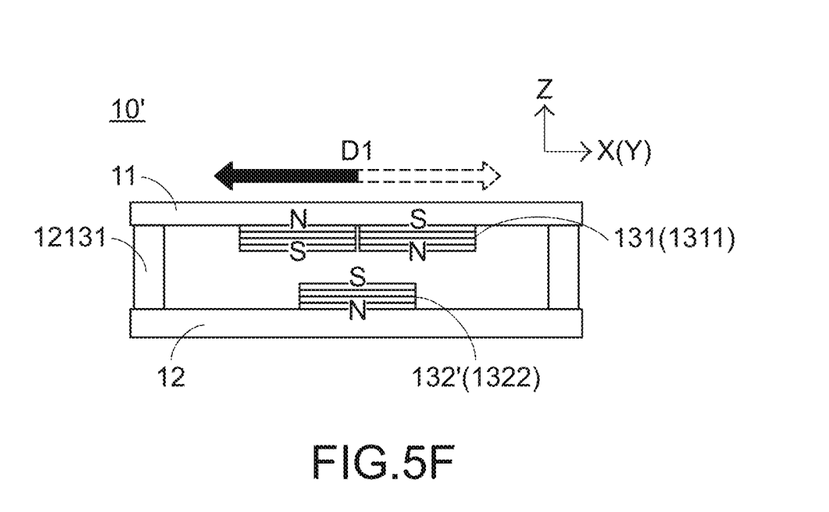
Figure 5G:
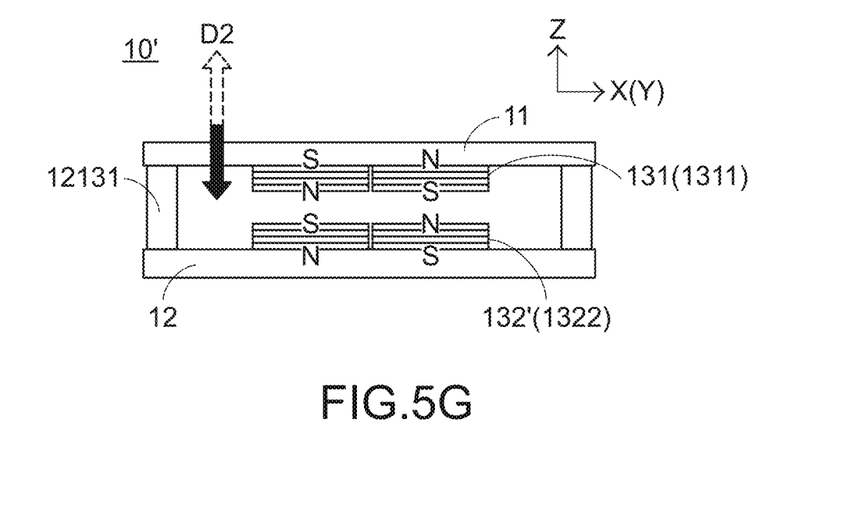
Figure 5H:
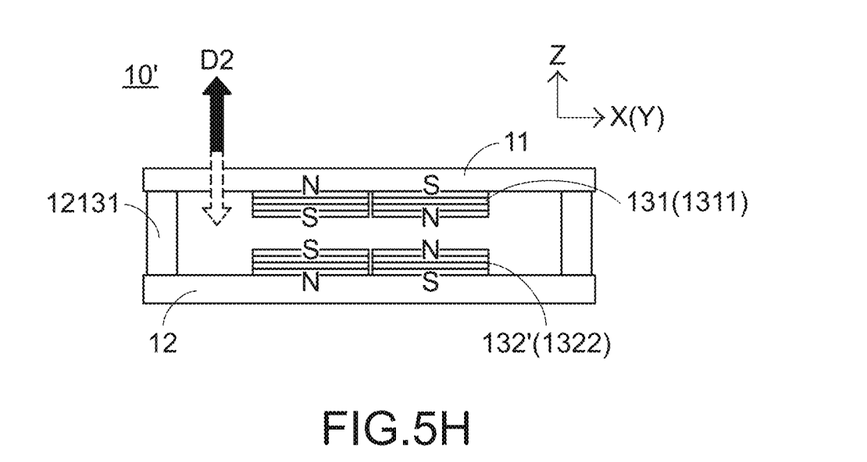
Figure 6:
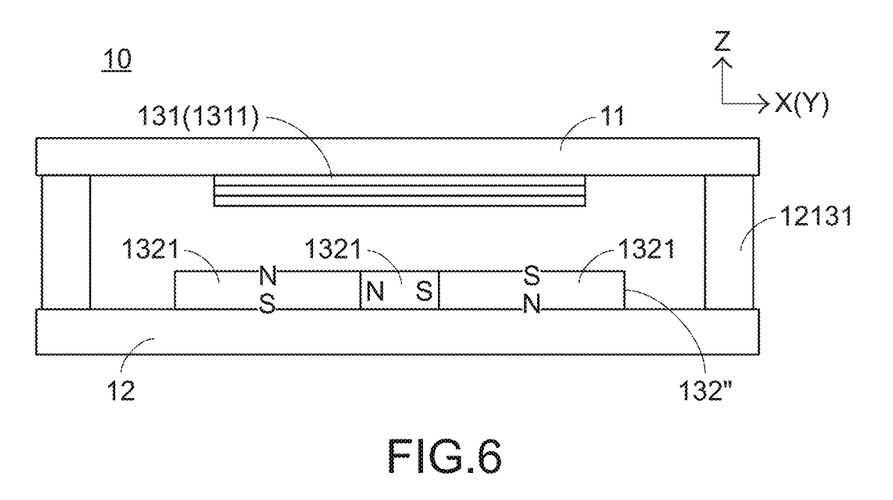
FIG. 6 is a schematic side view illustrating a variant example of the second actuating member in the touchpad of the present invention.

FIG. 1 is a schematic exploded view illustrating the structure of a touchpad according to a first embodiment of the present invention. FIG. 2 is a schematic side view illustrating the structure of the touchpad according to a first embodiment of the present invention. FIG. 3 is a schematic exploded view illustrating the structure of a touchpad according to a second embodiment of the present invention. FIGS. 4A, 4B, 4C and 4D are schematic side views illustrating two implementation examples of the relative movement between a first actuating member and a second actuating member in an actuating device of the touchpad according to the first embodiment. FIGS. 5A to 5H are schematic side views illustrating some other implementation examples of the relative movement between a first actuating member and a second actuating member in an actuating device of the touchpad according to some other embodiments. FIG. 6 is a schematic side view illustrating a variant example of the second actuating member in the touchpad of the present invention.

Please refer to FIGS. 1 and 2. In an embodiment, the touchpad 10 includes a substrate 11, an elastic bracket 12, and an actuating device 13. The substrate 11 has a first surface 111 and a second surface 112. The first surface 111 and the second surface 112 are opposed to each other. The elastic bracket 12 is located beside the second surface 112 of the substrate 11. The actuating device 13 includes a first actuating member 131 and a second actuating member 132. The first actuating member 131 is located near the second surface 112 of the substrate 11. The second actuating member 132 is fixed on a side of the elastic bracket 12 facing the substrate 11. In addition, the first actuating member 131 is substantially located over the second actuating member 132. The first actuating member 131 and the second actuating member 132 are movable relative to each other in response to a magnetic field force. As the first actuating member 131 and the second actuating member 132 are moved relative to each other, the relative vibration between the substrate 11 and the elastic bracket 12 is generated. In an embodiment, the first actuating member 131 includes at least one coil 1311. The coil 1311 is spirally wound to form a hollow region 13111. The extension direction D of the hollow region 13111 is perpendicular to the substrate 11 and the elastic bracket 12. The components of the touchpad 10 will be described in more details as follows.

Please refer to FIG. 1 again. The substrate 11 is a rectangular plate. Preferably but not exclusively, the substrate 11 is a printed circuit board. A touch sensing electrode is disposed on the first surface 111. When the touch sensing electrode is touched or pressed by the user's finger, the touch sensing electrode senses the touch position of the user's finger and outputs a corresponding touch sensing signal. In addition, plural electronic components (not shown) are installed on the second surface 112.

Please refer to FIGS. 1 and 2 again. The elastic bracket 12 is substantially a rectangular plate. Preferably but not exclusively, the elastic bracket 12 is made of aluminum, iron or any other appropriate metallic material. The elastic bracket 12 includes a supporting region 121 and a carrying region 122. The carrying region 122 is concaved in the negative direction of the Z axis with respect to the supporting region 121. Preferably but not exclusively, the supporting region 121 is connected with the carrying region 122. Alternatively, the supporting region 121 and the carrying region 122 are integrally formed as a one-piece structure. The supporting region 121 has a first thickness T1. The carrying region 122 has a second thickness T2. The first thickness T1 is greater than the second thickness T2.

The supporting region 121 includes plural avoidance holes 1211, plural first cantilever parts 1212, plural second cantilever parts 1213 and plural mounting holes 1214.

The avoidance holes 1211 are used to provide avoidance spaces for accommodating various electronic components. Consequently, the avoidance holes 1211 have various shapes and sizes. For example, the avoidance holes 1211 have rectangular, circular or irregular shapes.

The first cantilever parts 1212 are formed by stamping the elastic bracket 12. A pressure sensor is mounted on a side of the free end of each first cantilever part 1212 facing the substrate 11. The first cantilever part 1212 is used to support the pressure sensor. When a pressure is applied to the touchpad 10, the pressure sensor is driven to undergo elastic deformation. Consequently, the pressure sensor can detect the pressure on the touchpad 10. In an embodiment, the first cantilever parts 1212 are located near the middle site of the supporting region 121. The supporting region 121 includes three first cantilever parts 1212. It is noted that the number of the first cantilever parts 1212 is not restricted. That is, the number of the first cantilever parts 1212 may be adjusted according to the number of the pressure sensors.

The second cantilever parts 1213 are formed by stamping the edges of the elastic bracket 12. An elastic connecting element 12131 is bonded on a side of the free end of each second cantilever part 1213 close to the substrate 11. In addition, a pressure sensor is mounted on the side of the free end of each second cantilever part 1213 close to the substrate 11. The elastic connecting element 12131 is used to elastically support the substrate 11. The elastic connecting element 12131 is bonded on the second surface 112 of the substrate 11. Preferably but not exclusively, the elastic connecting element 12131 is made of silicone or rubber pad. The elastic bracket 12 is fixed on the casing of the electronic device (e.g., a notebook computer) through the mounting holes 1214. In an embodiment, the mounting hole 1214 are screw holes. The elastic bracket 12 is fixed on the casing of the electronic device in a screw locking manner.

In an embodiment, the carrying region 122 includes a platform part 1221 and plural connecting parts 1222.

The platform part 1221 is substantially a flat plate. The connecting parts 1222 are inclined plates that are extended from the edges of the platform part 1221 in the direction toward the positive direction of the Z axis. The carrying region 122 is connected with the supporting region 121 through the connecting parts 1222. Consequently, the carrying region 122 is concaved in the negative direction of the Z axis with respect to the supporting region 121.

The platform part 1221 includes two openings 12211, two first position-limiting members 12212 and at least one second position-limiting member 12213. The two openings 12211 are symmetrically formed in both sides of the middle site of the platform part 1221. The two first position-limiting members 12212 are bent structures that are respectively protruded from the edges of the two openings 12211 in the direction toward the positive direction of the Z axis. In addition, the two first position-limiting members 12212 are symmetrically arranged. The least one first position-limiting member 12212 is a bent structure that is protruded from one side of the platform part 1221 away from the supporting region 121 in the direction toward the positive direction of the Z axis.

Please refer to FIGS. 1 and 2 again. In an embodiment, the actuating device 13 includes the first actuating member 131 and the second actuating member 132.

In an embodiment, the first actuating member 131 includes the coil 1311. The coil 1311 is a conducting wire or an enameled wire, which is spirally wound to form the hollow region 13111. For example, the coil 1311 is a multi-layer coil 1311, e.g., a three-layer coil or a four-layer coil. The diameter of the coil 1311 is in the range between 0.05 mm and 0.1 mm. The turn number of the coil 1311 is 70 to 300. The thickness of the coil 1311 in the extension direction D is 0.4 mm. Preferably but not exclusively, the length of the long side of the coil 1311 is 8 mm, and the length of the short side of the coil 1311 is 5 mm. The diameter, the turn number, the thickness and the surface area of the coil 1311 may be adjusted according to the space configurations and the vibration requirements.

The second actuating member 132 includes a magnetic element 1321. Preferably but not exclusively, the magnetic element 1321 is a magnet. The coil 13111 is directly fixed on the second surface 112 of the substrate 11 in a welding manner or a bonding manner. The coil 1311 is located near the middle site of the platform part 1221. The magnetic member 1321 is aligned with the coil 1311 and fixed on the middle site of the platform part 1221. In addition, the two openings 12211 are not covered by the magnetic member 1321. The magnetic element 1321 is substantially contacted with the two first position-limiting members 12212 and the at least one second position-limiting member 12213. During the process of assembling the touchpad 10, the magnetic element 1321 can be quickly positioned and securely fixed on the platform part 1221 with the assistance of the two first position-limiting members 12212 and the at least one second position-limiting member 12213.

FIG. 3 is a schematic exploded view illustrating the structure of a touchpad according to a second embodiment of the present invention. In comparison with first embodiment, the structure of the first actuating member 131 in the touchpad of this embodiment is distinguished, and the substrate 11 in the touchpad of this embodiment is equipped with plural positioning structures (not shown). In an embodiment, the plural positioning structures are bare copper areas that are formed through a washing process of a printed circuit board. The other components of this embodiment are similar to those of the first embodiment, and not redundantly described herein.

In addition to the at least one coil 1311, the first actuating member 131 further includes at least one magnetic core 1312 and a support element 1313. The magnetic core 1312 is substantially a protrusion post in appearance. The at least one magnetic core 1312 is inserted into the hollow region 13111 of the corresponding coil 1311. In other words, the at least one coil 1311 is wound around the corresponding magnetic core 1312. The support element 1313 is substantially a support plate. In an embodiment, the support element 1313 includes a top surface 13131, a bottom surface 13132 and plural positioning notches 13133. The top surface 13131 and the bottom surface 13132 are opposed to each other. The top surface 13131 of the support element 1313 is fixed on the second surface 112 of the substrate 11. The at least one coil 1311 is fixed on the bottom surface 13132 of the support element 1313. The at least one magnetic core 1312 is protruded from the bottom surface 13132 of the support element 1313. The plural positioning notches 13133 are plural chamfers that are formed by punching or cutting the support element 1313 from the edge or corner toward the middle site of the support element 1313. The number and positions of the plural positioning notches 13133 match the number and positions of the positioning structures on the second surface 112 of the substrate 11. The linear distance between every two positioning structures is approximately equal to the linear distance between every two positioning notches 13133. Consequently, during the assembling process, the support element 1313 can be quickly aligned with the correct position of the second surface 112 of the substrate 11 and fixed on each other. For example, in case that three positioning structures are formed on the second surface 112 of the substrate 11, the support element 1313 is correspondingly equipped with three positioning notches 13133, and the linear distance between every two positioning structures of the three positioning structures is approximately equal to the linear distance between every two positioning notches 13133 of the three positioning notches 13133. It is noted that the numbers, the positions and the shapes of the positioning structures and the positioning notches 13133 may be adjusted according to different processes and product requirements. For example, the support element 1313 is fixed on the second surface 112 of the substrate 11 in a welding manner. The magnetic core 1312 is mode of iron or plastic material. Preferably but not exclusively, the support element 1313 is made of plastic material, manganese-zinc alloy or tinplate, or the support element 1313 is a flexible printed circuit board.

The relative motions of the first actuating member and the second actuating member in the actuating device of the touchpad according to the first embodiment will be illustrated with reference to FIGS. 4A, 4B, 4C and 4D.

A first implementation example of the relative movement between the first actuating member 131 and the second actuating member 132 will be illustrated with reference to FIGS. 4A and 4B. In this implementation example, the magnetization direction of the magnetic element 1321 is in parallel with the substrate 11 and the elastic bracket 12. When the coil 1311 is electrically conducted and an alternating magnetic field is generated in response to the change of the current direction, an attractive force and a repulsive force between the coil 1311 and the magnetic element 1321 are alternately generated. As the substrate 11 is driven by the actuating device 13, the substrate 11 is vibrated back and forth along a first vibration direction D1. The first vibration direction D1 is in parallel with the X-axis direction or the Y-axis direction.

A second implementation example of the relative movement between the first actuating member 131 and the second actuating member 132 will be illustrated with reference to FIGS. 4C and 4D. The operations of the actuating device of this embodiment are similar to those of the first embodiment. In comparison with the first embodiment, the magnetization direction of the magnetic element 1321 is distinguished. In this embodiment, the magnetization direction of the magnetic element 1321 is perpendicular to the substrate 11 and the elastic bracket 12. When the coil 1311 is electrically conducted and an alternating magnetic field is generated in response to the change of the current direction, an attractive force and a repulsive force between the coil 1311 and the magnetic element 1321 are alternately generated. As the substrate 11 is driven by the actuating device 13, the substrate 11 is vibrated back and forth along a second vibration direction D2. The second vibration direction D2 is in parallel with the Z-axis direction.

In some other variant examples of the touchpad 1, the structure of the second actuating member is distinguished. For example, as shown in FIGS. 5A to 5H, the second actuating member 132' includes at least a second coil 1322. The at least one second coil 1322 is aligned with the corresponding coil 1311 of the first actuating member 131 and fixed on one side of the elastic bracket 12 facing the substrate 11. As shown in FIG. 5A, the second coil 1322 is a copper wire or an enameled wire, which is spirally wound to form a second hollow region 13221. The extension direction D' of the second hollow region 13221 is in parallel with the hollow region 13111. In other words, the extension direction D' of the second hollow region 13221 is also perpendicular to the substrate 11 and the elastic bracket 12. The diameter of the second coil 1322 is in the range between 0.05 mm and 0.1 mm. The turn number of the second coil 1322 is 70 to 80. The thickness of the second coil 1322 in the extension direction D' is 0.4 mm. Preferably but not exclusively, the length of the long side of the second coil 1322 is 8 mm, and the length of the short side of the second coil 1322 is 5 mm. The diameter, the turn number, the thickness and the surface area of the second coil 1322 may be adjusted according to the space configurations and the magnetic field strength requirements.

The relative motions of the first actuating member 131 and the second actuating member 132' will be illustrated in more details with reference to FIGS. 5A to 5H.

A first implementation example of the relative movement between the first actuating member 131 and the second actuating member 132' will be illustrated with reference to FIGS. 5A and 5B. In this implementation example, the first actuating member 131 includes at least one coil 1311, and the second actuating member 132' includes a second coil 1322 and at least one second magnetic core 1323. The second magnetic core 1323 is substantially a protrusion post in appearance. The at least one second magnetic core 1323 is inserted into the second hollow region 13221 of the second coil 1322. In other words, the second coil 1322 is wound around the second magnetic core 1323. Preferably but not exclusively, the second magnetic core 1323 is mode of iron or plastic material.

The direction of the current flowing through the second coil 1322 is fixed, and thus a fixed magnetic field is generated. The magnetization direction of the second coil 1322 is perpendicular to the substrate 11 and the elastic bracket 12. When the coil 1311 is electrically conducted and an alternating magnetic field is generated in response to the change of the current direction, an attractive force and a repulsive force between the coil 1311 and the second coil 1322 are alternately generated. As the substrate 11 is driven by the actuating device 13, the substrate 11 is vibrated back and forth along the substrate 11 is vibrated back and forth along the second vibration direction D2. The second vibration direction D2 is in parallel with the Z-axis direction.

A second implementation example of the relative movement between the first actuating member 131 and the second actuating member 132' will be illustrated with reference to FIGS. 5C and 5D. In comparison with the implementation example of FIGS. 5A and 5B, the second actuating member 132' includes two second coils 1322 with the identical structures, and the second actuating member 132' is not equipped with the second magnetic core 1323. The direction of the current flowing through each of the two second coils 1322 is fixed, and thus a fixed resultant magnetic field is generated. The magnetization directions of the two second coils 1322 are perpendicular to the substrate 11 and the elastic bracket 12. When the coil 1311 is electrically conducted and an alternating magnetic field is generated in response to the change of the current direction, an attractive force and a repulsive force between the coil 1311 and the two second coils 1322 are alternately generated. As the substrate 11 is driven by the actuating device 13, the substrate 11 is vibrated back and forth along the first vibration direction D1. The first vibration direction DI is in parallel with the X-axis direction or the Y-axis direction. In this embodiment, the magnetization directions of the two second coils 1322 are opposite to each other.

A third implementation example of the relative movement between the first actuating member 131 and the second actuating member 132' will be illustrated with reference to FIGS. 5E and 5F. In comparison with the second implementation example, the first actuating member 131 includes two coils 1311 with the identical structures, and the second actuating member 132' includes one second coil 1322. The direction of the current flowing through the second coil 1322 is fixed, and thus a fixed magnetic field is generated. The magnetization direction of the second coil 1322 is perpendicular to the substrate 11 and the elastic bracket 12. When the two coils 1311 are electrically conducted and an alternating magnetic field is generated in response to the change of the current direction, an attractive force and a repulsive force between the two coils 1311 and the second coil 1322 are alternately generated. As the substrate 11 is driven by the actuating device 13, the substrate 11 is vibrated back and forth along the first vibration direction D1. The first vibration direction D1 is in parallel with the X-axis direction or the Y-axis direction. In this embodiment, the magnetization directions of the two coils 1311 are opposite to each other.

A fourth implementation example of the relative movement between the first actuating member 131 and the second actuating member 132' will be illustrated with reference to FIGS. 5G and 5H. In comparison with the third implementation example, the second actuating member 132' includes two second coils 1322 with the identical structures. The direction of the current flowing through each of the two second coils 1322 is fixed, and thus a fixed resultant magnetic field is generated. The magnetization directions of the two second coils 1322 are perpendicular to the substrate 11 and the elastic bracket 12. When the two coils 1311 are electrically conducted and an alternating magnetic field is generated in response to the change of the current direction, an attractive force and a repulsive force between the two coils 1311 and the two second coils 1322 are alternately generated. As the substrate 11 is driven by the actuating device 13, the substrate 11 is vibrated back and forth along the second vibration direction D2. The second vibration direction D2 is in parallel with the Z-axis direction. In this embodiment, the magnetization directions of the two coils 1311 are opposite to each other, and the magnetization directions of the two second coils 1322 are opposite to each other.

A variant example of the second actuating member 132" is shown in FIG. 6. In this embodiment, the second actuating member 132" includes plural magnetic elements 1321. The plural magnetic elements 1321 are arranged in a Halbach array, especially a linear Halbach array. The second actuating member 132" formed by the linear Halbach array can increase the magnetic field on one side of the array and offset the magnetic field on the other side. In the arrangement of the plural magnetic elements 1321 shown in FIG. 6, the magnetic field strength on the top surface of the second actuating member 132" is higher than the magnetic field strength on the bottom surface of the second actuating member 132". Consequently, the top surface of the second actuating member 132" faces the substrate 11 and the first actuating member 131.

From the above descriptions, the touchpad of the present invention at least has the following benefits:

Firstly, the actuating device of the present invention is a planar coil structure that is formed by spirally winding a physical coil (e.g., a conducting wire or an enameled wire). When compared with the circuit board having a multi-layer inductive loop, the fabricating cost of the actuating device of the present invention is largely reduced because the etching process is not required. In addition, the actuating device of the present invention is easier to be repaired and disassembled. Moreover, by adjusting the diameter, the total length or the material of the coil, the inductance value of the coil can be further changed, and the vibration amplitude can be adjusted. As a consequence, the design offers greater tolerance and flexibility.

Secondly, the actuating device of the present invention is equipped with the support element for facilitating managing the physical coil, and thus the coil is not scattered. In addition, the support element is equipped with positioning notches, and the substrate is equipped with positioning structures. Consequently, the assembling efficiency is enhanced, and the product yield is increased.

Thirdly, the elastic bracket includes a supporting region and a carrying region. The second actuating member is installed on the carrying region. The plate structure of the carrying region is thinner than the plate structure of the supporting region. Consequently, the overall thickness of the touchpad can be effectively reduced.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A touchpad, comprising:
a substrate having a first surface and a second surface, wherein the first surface and the second surface are opposed to each other;
an elastic bracket located beside the second surface of the substrate; and
an actuating device comprising a first actuating member and a second actuating member, wherein the first actuating member is located near the second surface of the substrate, and the second actuating member is aligned with the first actuating member and fixed on a side of the elastic bracket facing the substrate, wherein the first actuating member and the second actuating member are movable relative to each other in response to a magnetic field force, so that a relative vibration between the substrate and the elastic bracket is generated,
wherein the first actuating member comprises at least one first coil, each of the at least one first coil is spirally wound to form a first hollow region, and an extension direction of the first hollow region is perpendicular to the substrate and the elastic bracket,
wherein the first actuating member further includes a support element, and the support element has a top surface and a bottom surface, wherein the top surface and the bottom surface are opposed to each other, the at least one coil is fixed on the bottom surface of the support element, and the top surface of the support element is fixed on the second surface of the substrate.

2. The touchpad according to claim 1, wherein the first coil is a copper wire.

3. The touchpad according to claim 1, wherein a diameter of the first coil is in a range between 0.05 mm and 0.1 mm, and a turn number of the first coil is 70 to 300.

4. The touchpad according to claim 1, wherein at least one positioning structure is formed on the second surface of the substrate, and the support element further comprises at least one positioning notch corresponding to the at least one positioning structure.

5. The touchpad according to claim 1, wherein the support element is made of plastic material, manganese-zinc alloy or tinplate, or the support element is a flexible printed circuit board.

6. The touchpad according to claim 1, wherein the elastic bracket includes a supporting region and a carrying region, wherein the supporting region has a first thickness, the carrying region has a second thickness, and the first thickness is greater than the second thickness.

7. The touchpad according to claim 6, wherein the second actuating member is fixed on a middle site of the carrying region, the first actuating member is located near the middle site of the carrying region, and the first actuating member is located over the second actuating member.

8. The touchpad according to claim 1, wherein the second actuating member comprises a magnetic element, and a magnetization direction of the magnetic element is perpendicular to or in parallel with the extension direction of the first hollow region.

9. The touchpad according to claim 1, wherein the second actuating member comprises at least one second coil, each of the at least one second coil is spirally wound to form a second hollow region, and an extension direction of the second hollow region is in parallel with the extension direction of the first hollow region.

10. The touchpad according to claim 1, wherein the second actuating member comprises plural magnetic elements, which are arranged in a Halbach array.

* * * * *